United States Patent
Cheng et al.

(10) Patent No.: US 12,132,568 B2
(45) Date of Patent: Oct. 29, 2024

(54) BLOCK PROCESSING METHOD, NODE, AND MEDIUM

(71) Applicants: China Mobile Communication Co., Ltd Research Institute, Beijing (CN); China Mobile Communications Group Co., Ltd., Beijing (CN)

(72) Inventors: Weiqiang Cheng, Beijing (CN); Han Li, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 5 days.

(21) Appl. No.: 18/016,105

(22) PCT Filed: Jul. 13, 2021

(86) PCT No.: PCT/CN2021/106006
§ 371 (c)(1),
(2) Date: Jan. 13, 2023

(87) PCT Pub. No.: WO2022/012530
PCT Pub. Date: Jan. 20, 2022

(65) Prior Publication Data
US 2023/0275691 A1    Aug. 31, 2023

(30) Foreign Application Priority Data
Jul. 14, 2020  (CN) .......................... 202010674247.7

(51) Int. Cl.
*H04L 1/00* (2006.01)

(52) U.S. Cl.
CPC .......... *H04L 1/0041* (2013.01); *H04L 1/0045* (2013.01)

(58) Field of Classification Search
CPC ... H04L 1/0041; H04L 1/0045; H04L 1/0075; H04L 1/0078; H03M 13/25; H03M 13/251; H03M 13/2927
See application file for complete search history.

(56) References Cited

U.S. PATENT DOCUMENTS

2003/0192002 A1  10/2003  Sweeney et al.
2010/0199144 A1   8/2010  Li et al.
(Continued)

FOREIGN PATENT DOCUMENTS

| CN | 101867440 A | 10/2010 |
| CN | 102624493 A | 8/2012 |

(Continued)

OTHER PUBLICATIONS

A. Belogolovy, et al., "Forward Error Correction for 10GBASE-KR PHY", IEEE 802.3ap, Nov. 2005.
(Continued)

*Primary Examiner* — Shelly A Chase
(74) *Attorney, Agent, or Firm* — Price Heneveld LLP (57) ABSTRACT

A block processing method, node and medium are provided. The method includes: determining, in a metro transport network, Ethernet or flexible Ethernet, 64B/66B blocks of a forward error correction (FEC) codeword with errors that cannot been corrected; replacing all of the 64B/66B blocks in the FEC codeword with error control blocks, or replacing each invalid 64B/66B block in the FEC codeword with an error control block.

9 Claims, 3 Drawing Sheets

(56) References Cited

U.S. PATENT DOCUMENTS

| | | |
|---|---|---|
| 2011/0013690 A1 | 1/2011 | Kobayashi et al. |
| 2011/0216782 A1 | 9/2011 | Nakajima et al. |
| 2012/0257887 A1* | 10/2012 | Li .................. H04L 1/0045 398/17 |
| 2020/0295870 A1* | 9/2020 | Jing ................. H04Q 11/0067 |
| 2020/0358722 A1* | 11/2020 | Gareau ............. H04L 49/9057 |
| 2021/0075540 A1 | 3/2021 | Lu et al. |
| 2021/0105072 A1 | 4/2021 | Chen |
| 2021/0111933 A1 | 4/2021 | Xiao et al. |

FOREIGN PATENT DOCUMENTS

| | | |
|---|---|---|
| CN | 109951896 A | 6/2019 |
| CN | 110519004 A | 11/2019 |
| CN | 110650002 A | 1/2020 |
| JP | 2004157927 A | 6/2004 |
| JP | 2011182287 A | 9/2011 |
| JP | 2012161103 A | 8/2012 |
| JP | 2021505089 A | 2/2021 |
| JP | 2021528016 A | 10/2021 |
| WO | 2009005154 A1 | 1/2009 |
| WO | 2016144953 A1 | 9/2016 |
| WO | 2019105471 A1 | 6/2019 |
| WO | 2019242590 A1 | 12/2019 |

OTHER PUBLICATIONS

IEEE 802.3ap, "Amendment to IEEE Std 802.3-2005: CSMA/CD, Part 3: Carrier Sense Multiple Access with Collision Detection (CSMA/CD) Access Method and Physical Layer Specifications Amendment 4: Ethernet Operation over Electrical Backplanes", May 22, 2007.

* cited by examiner

Fig. 9 ations No. 202010674247.7 filed in China on Jul. 14, 2020,
BLOCK PROCESSING METHOD, NODE, AND MEDIUM

CROSS-REFERENCE TO RELATED APPLICATION

The present application is the U.S. national phase of PCT Application No. PCT/CN2021/106006 filed on Jul. 13, 2021, which claims a priority to the Chinese patent application No. 202010674247.7 filed in China on Jul. 14, 2020, both of which are incorporated herein by reference in their entireties.

TECHNICAL FIELD

The present disclosure relates to the field of wireless communications technology, in particular to a block processing method, node and medium.

BACKGROUND

The related art suffers from the problem of error marking propagation in the error marking mechanism of metro transport network (MTN) in the related art.

SUMMARY

The present disclosure provides a block processing method, node and medium, to solve the problem of error marking propagation.

The present disclosure provides the following technical solution.

A block processing method includes:
determining 64B/66B blocks of a forward error correction (FEC) codeword with errors that cannot been corrected in a metro transport network (MTN), or Ethernet, or flexible Ethernet (FlexE);
replacing all of the 64B/66B blocks in the FEC codeword with error control blocks, or replacing each invalid 64B/66B block in the FEC codeword with an error control block.

In an implementation, the 64B/66B block may be a 64B/66B block defined in IEEE 802.3 standard.

In an implementation, the replacing all of the 64B/66B blocks in the FEC codeword with error control blocks includes:
replacing all of the 64B/66B blocks in the FEC codeword with errors that cannot been corrected during FEC decoding with error control blocks in a section layer or path layer or adaptation layer or physical layer of the MTN; or,
replacing all of the 64B/66B blocks in the FEC codeword with errors that cannot been corrected during FEC decoding with error control blocks in a physical layer of the Ethernet; or,
replacing all of the 64B/66B blocks in the FEC codeword with errors that cannot been corrected during FEC decoding with error control blocks in a physical layer of the FlexE.

In an implementation, the invalid block is a block marked as invalid in the 64B/66B blocks when errors in the FEC codeword cannot be corrected by FEC decoding, wherein the 64B/66B blocks result from that, for physical layers (PHYs) with FEC, four 64B/66B blocks are transcoded into one 256B/257B block before FEC encoding at a transmit side and transcoded back into the four 64B/66B blocks at a receiver side after the FEC decoding.

In an implementation, the error control block refers to an error control block /E/ defined in IEEE 802.3; the invalid block refers to a 64B/66B block with a synchronization header 0b00 or 0b11.

An MTN node includes:
a processor, configured to read a program stored in a memory to implement following steps:
determining 64B/66B blocks of an FEC codeword with errors that cannot been corrected in an MTN, or Ethernet, or FlexE;
replacing all of the 64B/66B blocks in the FEC codeword with error control blocks, or replacing each invalid 64B/66B block in the FEC codeword with an error control block;
a transceiver, configured to receive and transmit data under control of the processor.

In an implementation, the replacing all of the 64B/66B blocks in the FEC codeword with error control blocks includes:
replacing all of the 64B/66B blocks in the FEC codeword with errors that cannot been corrected during FEC decoding with error control blocks in a section layer or path layer or adaptation layer or physical layer of the MTN; or,
replacing all of the 64B/66B blocks in the FEC codeword with errors that cannot been corrected during FEC decoding with error control blocks in a physical layer of the Ethernet; or,
replacing all of the 64B/66B blocks in the FEC codeword with errors that cannot been corrected during FEC decoding with error control blocks in a physical layer of the FlexE.

In an implementation, the invalid block is a block marked as invalid in the 64B/66B blocks when errors in the FEC codeword cannot be corrected by FEC decoding, wherein the 64B/66B blocks result from that, for PHYs with FEC, four 64B/66B blocks are transcoded into one 256B/257B block before FEC encoding at a transmit side and transcoded back into the four 64B/66B blocks at a receiver side after the FEC decoding.

In an implementation, the error control block refers to an error control block /E/ defined in IEEE 802.3; the invalid block refers to a 64B/66B block with a synchronization header 0b00 or 0b11.

An MTN node includes:
a determination module, configured to determine 64B/66B blocks of an FEC codeword with errors that cannot been corrected in an MTN, or Ethernet, or FlexE;
a replacing module, configured to replace all of the 64B/66B blocks in the FEC codeword with error control blocks, or replace each invalid 64B/66B block in the FEC codeword with an error control block.

In an implementation, the replacing module is further configured to:
replace all of the 64B/66B blocks in the FEC codeword with errors that cannot been corrected during FEC decoding with error control blocks in a section layer or path layer or adaptation layer or physical layer of the MTN; or,
replace all of the 64B/66B blocks in the FEC codeword with errors that cannot been corrected during FEC decoding with error control blocks in a physical layer of the Ethernet; or,
replace all of the 64B/66B blocks in the FEC codeword with errors that cannot been corrected during FEC decoding with error control blocks in a physical layer of the FlexE.

In an implementation, the invalid block is a block marked as invalid in the 64B/66B blocks when errors in the FEC codeword cannot be corrected by FEC decoding, wherein the 64B/66B blocks result from that, for PHYs with FEC, four 64B/66B blocks are transcoded into one 256B/257B block before FEC encoding at a transmit side and transcoded back into the four 64B/66B blocks at a receiver side after the FEC decoding.

In an implementation, the error control block refers to an error control block /E/ defined in IEEE 802.3; the invalid block refers to a 64B/66B block with a synchronization header 0b00 or 0b11.

A computer readable storage medium storing a computer program, wherein the computer program is configured to be executed by a processor to implement the foregoing block processing method.

The present disclosure has following beneficial effects.

In the technical solution provided by embodiments of the present disclosure, the invalid block is replaced with an error control block. In the solution, after an invalid block is identified, it is replaced with an error control block; since the error control block is different from the invalid block, the error control block may be forwarded safely, and be integrated with streams from other sources into one transmission channel, these streams may be mapped to calendar slots belonging to the same block, therefore a stream from a source with an error is prevented from contaminating the streams from other sources that are error-free.

BRIEF DESCRIPTION OF THE DRAWINGS

The accompany drawings are provided to facilitate further understanding of the present disclosure, and constitute a part of the present disclosure. Exemplary embodiments and description thereof provided in the present disclosure serve to illustrate the present disclosure, and by no means form undue limitations on the present disclosure.

DETAILED DESCRIPTION

Following discovery has been made during research.

First, error marking in the MTN is introduced below.

The 66B coding design for the Ethernet is very robust, and provides a superior mean time to false packet acceptance (MTTFPA) when implemented through the physical layer directly; the physical layer provides a bit error rate (BER) of 10-12 or higher, and provides a sufficiently random error distribution; these mechanisms include:

1) error multiplication in the scrambler;
2) 2-bit Hamming distance between 66B coding valid sync headers, and 4-bit Hamming distance between valid control block types, thus providing high confidence level of starting and ending positions of data packets;
3) medium access control (MAC) frame check sequence (FCS);
4) a high bit error rate (hi_ber) state machine may disconnect, if the basic BER of the connection degrades below the point where coding may be performed with confidence to provide satisfactory performance.

All these mechanisms basically guarantee that not a single erroneous packet will be transported to a higher layer (only once in the lifetime of the universe).

In an Ethernet interface with forward error correction (FEC), the basic performance of the physical layer link is much worse, and a satisfactory robustness cannot be provided by using 66B coding only. For example, the error rate of a 50GBASE-LR interface before FEC is 2.4×10−4 or better. Thus, a different method is required to provide robustness against errors. The method is as follows.

First, during coding, four 66B blocks as a group are transcoded into one 257B block. In the transcoding process, the sync header redundancy (2-bit Hamming distance) and the control block type redundancy (4-bit Hamming distance) are discarded. The design expects the FEC to compensate for the resultant robustness degradation. Additionally, the used FEC algorithm has a high sensitivity in sensing whether errors in the FEC codeword can be corrected (the possibility of failure to sense whether errors in the FEC codeword can be corrected is less than 1e−6), meanwhile, when an FEC codeword completely or partially uncorrectable is identified, these 66B codewords are marked, so that the subsequent processing is aware that the error is uncorrectable, and accurately discards the entire message where the marked codeword reside. Such error marking method is quite simple, that is, marking the 66B block with the sync header "0x11", i.e., an illegal block.

The error propagation in MTN is introduced below.

Figure 1:
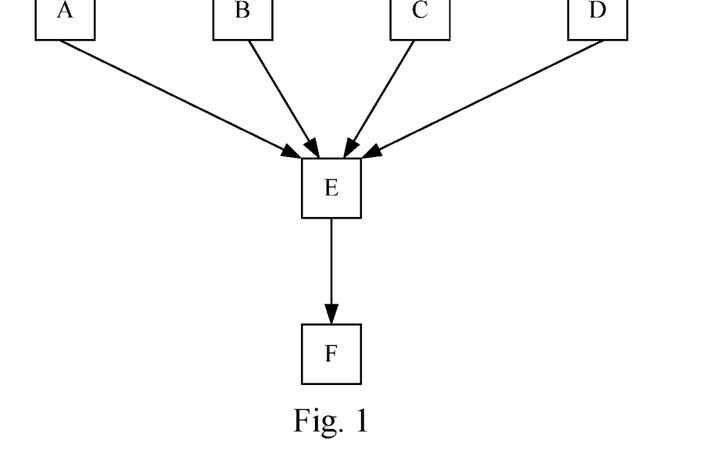
FIG. 1 is a schematic diagram of a hypothetical network configuration used for illustrating forwarding behavior according to an embodiment of the present disclosure.

FIG. 1 is a schematic diagram of a hypothetical network configuration to illustrate forwarding behavior. As shown in FIG. 1, a node E receives MTN client signals from nodes A, B, C and D. The data from nodes A, B and D are all normal, while the data from node C has an uncorrectable FEC codeword. The node E receives client signals from the nodes A, B, C and D, and maps the signals to adjacent calendar slots and forwards the signals to a node F on an interface from the node E to the node F.

Figure 2:
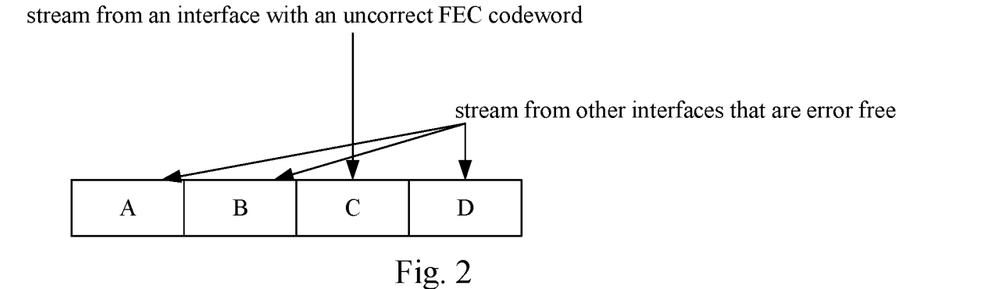
FIG. 2 is a schematic diagram of coding according to an embodiment of the present disclosure.

The link from the node E to the node F has an FEC coder, which involves transcoding into a 257B calendar slot organized stream. FIG. 2 is a schematic diagram of coding, wherein all streams of the four sources may be combined into the same 257B block shown in FIG. 2.

As long as any one of the four 66B blocks has an invalid sync header, the 257B transcoder sets the first 5 bits of the 257B block as 01111, which is an invalid pattern (the first 0 denotes that there is at least one control block, however, the following bits denote that all four positions are data blocks).

At the receiver of the node F, a 257B transcoder will identify the invalid pattern, and mark the sync headers of all four 66B blocks resulting from the transcoding and decoding of the 257B block as invalid. As a result, not only the stream from the node C is marked as erroneous (which is correct marking), but also the streams from the nodes A, B and D are marked as erroneous (which is mismarking).

Obviously, this kind of error propagation causes many problems, e.g., a stream in an otherwise correct channel would subject to error due to being coded with a stream in an incorrect channel, thereby causing packet loss without causes.

A specific implementation of the present disclosure is described below with reference to the accompany drawings.

Figure 3:
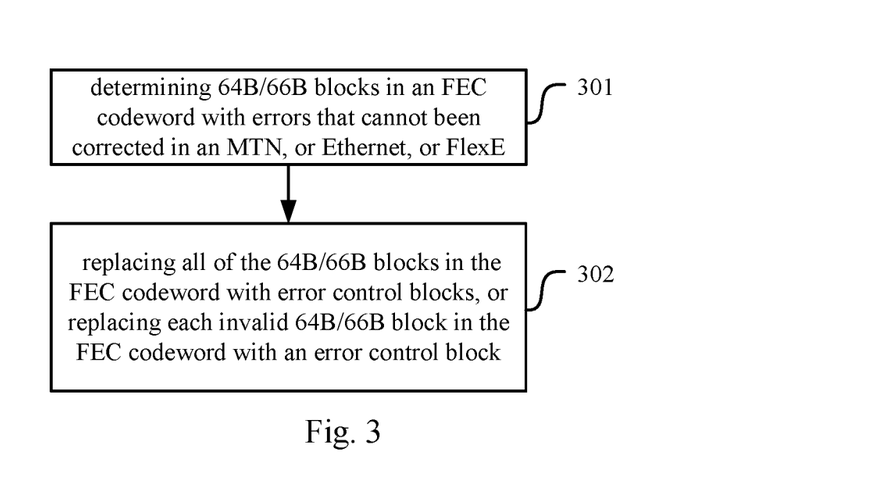
FIG. 3 is a schematic diagram of an implementation process of a block processing method according to an embodiment of the present disclosure.

FIG. 3 is a schematic diagram of an implementation process of a block processing method. As shown in the figure, the method may include:

step 301, determining 64B/66B blocks in a forward error correction (FEC) codeword with errors that cannot been corrected (as referred as a FEC codeword with errors that have not been corrected, or an uncorrected FEC codeword) in an MTN, or Ethernet, or FlexE;

step 302, replacing all of the 64B/66B blocks in the FEC codeword with error control blocks, or replacing each invalid 64B/66B block in the FEC codeword with an error control block.

Specifically, to ensure proper error marking of all MTN paths, all blocks in a FEC codeword with uncorrected errors in MTN path characteristic information (CI) are replaced with error control blocks (/E/).

In an implementation, the 64B/66B block may be a 64B/66B block defined in IEEE 802.3 standard.

In an implementation, the replacing all of the 64B/66B blocks in the FEC codeword with error control blocks includes:

replacing all of the 64B/66B blocks in the FEC codeword with errors that cannot been corrected during FEC decoding with error control blocks in a section layer or path layer or adaptation layer or physical layer of the MTN; or, replacing all of the 64B/66B blocks in the FEC codeword with errors that cannot been corrected during FEC decoding with error control blocks in a physical layer of the Ethernet; or, replacing all of the 64B/66B blocks in the FEC codeword with errors that cannot been corrected during FEC decoding with error control blocks in a physical layer of the FlexE (flexible Ethernet, FlexEthernet).

The invalid block is a block marked as invalid in the 64B/66B blocks when errors in the FEC codeword cannot be corrected by FEC decoding, wherein the 64B/66B blocks result from that, for PHYs with FEC, four 64B/66B blocks are transcoded into one 256B/257B block before FEC encoding at a transmit side and transcoded back into the four 64B/66B blocks at a receiver side after the FEC decoding.

Specifically, for PHYs with FEC, four 64B/66B blocks are transcoded into one 256B/257B block before FEC encoding at the transmit side and transcoded back into 64B/66B blocks at the receiver side after the FEC decoding. When the FEC decoding fails to correct errors in a FEC codeword, some or all of the 64B/66B blocks will be marked with invalid sync headers 0b00 or 0b11.

In the subsequent 64B/66B to 256B/257B transcoding process, one invalid block with a sync header 0b00 or 0b11, or block type being invalid, will render the other 3 valid 64B/66B blocks invalid.

Taking an Institute of Electrical and Electronics Engineers (IEEE) standard as an example, For [IEEE 802.3] PHYs with FEC, four 64B/66B blocks are transcoded into one 256B/257B block before FEC encoding at the transmit side and transcoded back into 64B/66B blocks at the receiver side after the FEC decoding. When the FEC decoder fails to correct errors in a FEC codeword, some or all of the 64B/66B blocks will be marked with invalid sync headers (0b00 or 0b11). The error marking specified in [IEEE 802.3] is designed to ensure that every packet in an uncorrected FEC codeword has at least one block with an invalid sync header, under the assumption that there is a single MAC associated with the PHY.

To prevent the invalid block from contaminating valid blocks in other MTN paths in the format conversion between 64B/66B and 256B/257B, an error control block is used to replace the invalid block in the MTN path.

Specifically, MTN section layer uses the FlexE calendar slot structure to channelize the PHY(s) to support multiple paths, each of which is a separate MAC. Since the error marking specified in [IEEE 802.3] is not designed for this application, it may not mark at least one block in every packet that is affected by a FEC codeword with uncorrected errors. Further, MTN supports switching of the path layer. Switching a block that has been marked (e.g., with a corrupted sync header) to another interface and then subsequently transcoding that block can lead to contamination of other paths.

In an implementation, the error control block refers to an error control block /E/ defined in IEEE 802.3; the invalid block refers to a 64B/66B block with a synchronization header 0b00 or 0b11.

The sync header of the control block is 10 in binary, and the control block type is one byte following the header.

Figure 4:
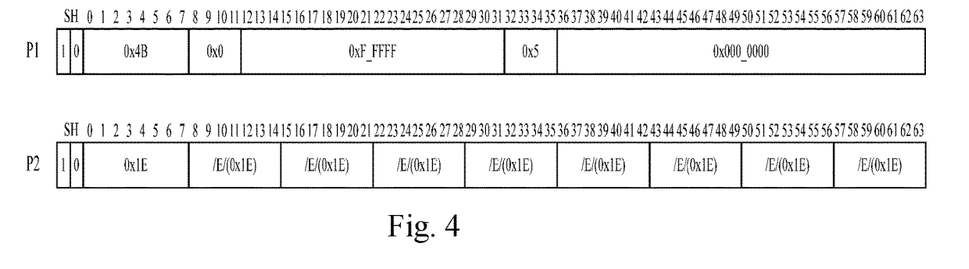
FIG. 4 is a schematic diagram of a format of an error control block according to an embodiment of the present disclosure.

Specifically, FIG. 4 is a schematic diagram of a format of an error control block. The error control block may be as shown in FIG. 4.

To solve the aforementioned problem related to error marking and error propagation, each PHY at the receiver side may be added with a function, i.e., identifying invalid block (sync header is "00" or "11"). If an invalid block is found, it is replaced with an "error control block".

Different from the invalid block, the "error control block" may be forwarded safely, and be integrated with streams from other sources into one transmission channel, these streams may be mapped to a calendar slot belonging to the same 257B block, without causing a stream from a source with an error to contaminate the streams from other sources that are error-free.

In implementations, there may be at least two manners of replacing.

Manner 1, replacing all of the 64B/66B blocks in the FEC codeword with error control blocks includes replacing the FEC codeword with errors that cannot been corrected by the FEC decoder with the error control blocks during FEC decoding.

Manner 2, replacing each invalid 64B/66B block in the FEC codeword with an error control block includes replacing invalid blocks generated in the FEC decoding process with error control blocks after the FEC decoding.

Figure 5:
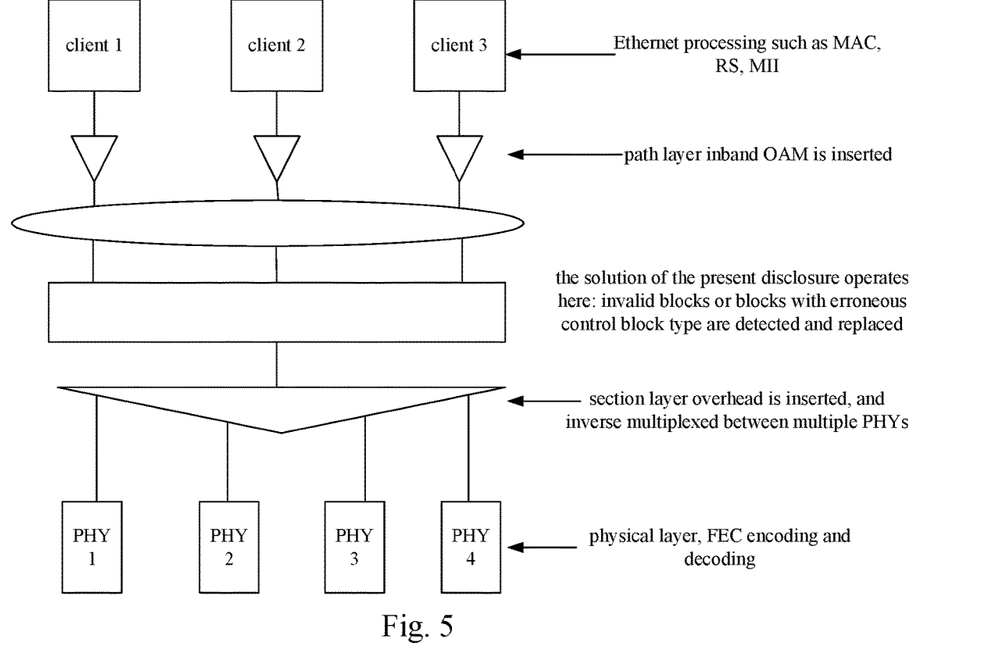
FIG. 5 is a schematic diagram of a block processing architecture according to an embodiment of the present disclosure.

Specifically, FIG. 5 is a schematic diagram of a block processing architecture. As shown in the figure, the architecture may adopt the mechanism as shown. In the receiving direction, information of each PHY of a given section layer needs to be descrambled first, and FEC decoding is performed when signal adaptation is performed for each PHY. For an FEC codeword with errors that cannot been corrected in the FEC decoding, the FEC decoder marks a part of or all of the 64B/66B blocks of the codeword with the sync header 0b00 or 0b11, i.e., invalid block. In the solution, for the FEC codeword that cannot be corrected by the FEC decoder, a part of or all of the 64B/66B blocks of the codeword are eventually replaced with "error control blocks".

Figure 6:
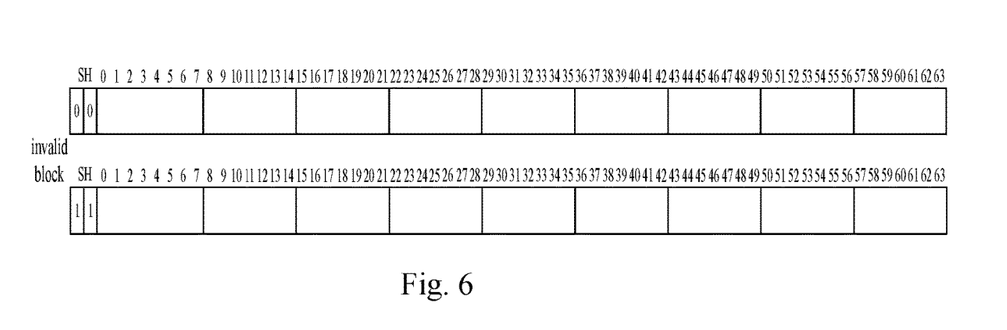
FIG. 6 is a schematic diagram of a structure of a 64B/66B invalid block according to an embodiment of the present disclosure.

FIG. 6 is a schematic diagram of a structure of a 64B/66B invalid block. The 64B/66B invalid block (the first two bits of the 66 bits denote a sync header which has a binary value of 00 or 11) is as shown in FIG. 6.

Figure 7:
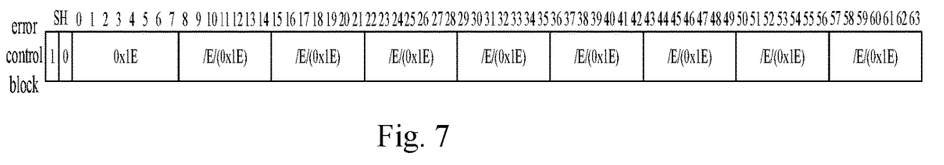
FIG. 7 is a schematic diagram of a format of a 64B/66B error control block according to an embodiment of the present disclosure.

FIG. 7 is a schematic diagram of a format of a 64B/66B error control block. The format of the 64B/66B error control block is as shown in FIG. 7.

MTN error identification is described in detail below.

Mode 1: the blocks are decoded normally according to FEC, and the blocks with invalid sync headers generated in the decoding process are replaced with error control blocks in subsequent processing.

For PHYs with FEC, four 64B/66B blocks are transcoded into one 256B/257B block before FEC encoding at the transmit side and transcoded back into 64B/66B blocks at the receiver side after the FEC decoding. When the FEC decoding fails to correct errors in a FEC codeword, the FEC decoder marks some or all of the 64B/66B blocks in the FEC codeword with invalid sync headers 0b00 or 0b11, namely, invalid blocks.

In a subsequent 64B/66B to 256B/257B transcoding process, one invalid block with a sync header 0b00 or 0b11, or a block with an invalid control block type, will render the other 3 valid 64B/66B blocks invalid. When client signals of multiple MTN paths are multiplexed on the MTN network, the invalid block or the block with an invalid control block type in one path may contaminate valid blocks in other MTN paths.

Figure 8:
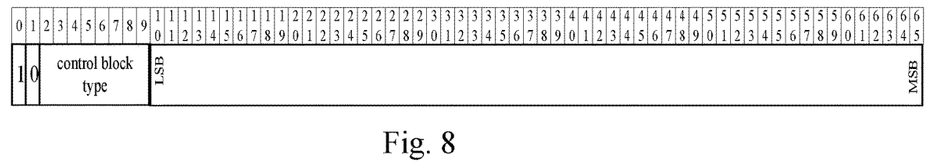
FIG. 8 is a schematic diagram of a location of control block type according to an embodiment of the present disclosure.

To solve the problem, following can be done:
first, checking for invalid blocks, i.e., checking whether the sync header of each block is 0b00 or 0b11;
second, checking the control block type, the sync header of a control block is "10" in binary, the control block type is one byte following the sync header. FIG. 8 is a schematic diagram of a location of control block type. The control block type must be the following hexadecimal numbers, otherwise the block has an invalid control block. Valid control block type includes: 0x00, 0x2D, 0x33, 0x66, 0x55, 0x1E, 0x78, 0x4B, 0x87, 0x99, 0xAA, 0xB4, 0xCC, 0xD2, 0xE1, 0xFF.

The identified invalid blocks or blocks with an invalid control block type are replaced with error control blocks.

Mode 2: during FEC decoding, if an FEC codeword that cannot be corrected by the FEC decoder is identified, all the 64B/66B blocks of the codeword are replaced with "error control blocks".

Based on the same inventive concept, embodiments of the present disclosure further provide an MTN node and a computer readable storage medium. The principle in which these devices solve problem is the same as that of the block processing method, therefore, for the implementation of these devices, references may be made to the block processing method, and a repeated description is omitted herein.

The technical solution provided by the embodiments of the present disclosure may be implemented as follows.

Figure 9:
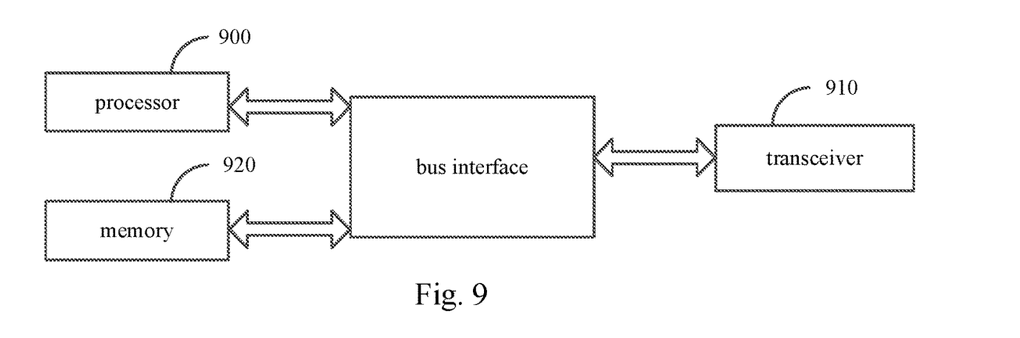
FIG. 9 is a schematic diagram of an MTN node structure according to an embodiment of the present disclosure.

FIG. 9 is a schematic diagram of an MTN node structure. As shown in the figure, the node includes:
a processor 900, configured to read a program in a memory 920 to implement following steps:
determining 64B/66B blocks of an FEC codeword with errors that cannot been corrected in an MTN, or Ethernet, or FlexE;
replacing all of the 64B/66B blocks in the FEC codeword with error control blocks, or replacing each invalid 64B/66B block in the FEC codeword with an error control block;
a transceiver 910, configured to receive and transmit data under control of the processor 900.

In an implementation, the replacing all of the 64B/66B blocks in the FEC codeword with error control blocks includes:
replacing all of the 64B/66B blocks in the FEC codeword with errors that cannot been corrected during FEC decoding with error control blocks in a section layer or path layer or adaptation layer or physical layer of the MTN; or,
replacing all of the 64B/66B blocks in the FEC codeword with errors that cannot been corrected during FEC decoding with error control blocks in a physical layer of the Ethernet; or,
replacing all of the 64B/66B blocks in the FEC codeword with errors that cannot been corrected during FEC decoding with error control blocks in a physical layer of the FlexE.

In an implementation, the invalid block is a block marked as invalid in the 64B/66B blocks when errors in the FEC codeword cannot be corrected by FEC decoding, wherein the 64B/66B blocks result from that, for PHYs with FEC, four 64B/66B blocks are transcoded into one 256B/257B block before FEC encoding at a transmit side and transcoded back into the four 64B/66B blocks at a receiver side after the FEC decoding.

In an implementation, the error control block refers to an error control block /E/ defined in IEEE 802.3; the invalid block refers to a 64B/66B block with a synchronization header 0b00 or 0b11.

In FIG. 9, a bus architecture may include any number of interconnected buses and bridges, and connects various circuits including one or more processors represented by the processor 900 and memory represented by the memory 920. The bus architecture may also connect various other circuits such as peripherals, voltage regulators and power management circuits, which is well known in the art. Therefore, a detailed description thereof is omitted herein. A bus interface provides an interface. The transceiver 910 may be multiple elements, such as a transmitter and a receiver, to allow for communication with various other apparatuses on the transmission medium. The processor 900 is responsible for supervising the bus architecture and normal operation, and the memory 920 may store the data being used by the processor 900 during operation.

An embodiment of the present disclosure further provides an MTN node, including:
a determination module, configured to determine 64B/66B blocks of an FEC codeword with errors that cannot been corrected in an MTN, or Ethernet, or FlexE;
a replacing module, configured to replace all of the 64B/66B blocks in the FEC codeword with error control blocks, or replace each invalid 64B/66B block in the FEC codeword with an error control block.

In an implementation, the replacing module is further configured to:
replace all of the 64B/66B blocks in the FEC codeword with errors that cannot been corrected during FEC decoding with error control blocks in a section layer or path layer or adaptation layer or physical layer of the MTN; or, replace all of the 64B/66B blocks in the FEC codeword with errors that cannot been corrected during FEC decoding with error control blocks in a physical layer of the Ethernet; or, replace all of the 64B/66B blocks in the FEC codeword with errors that cannot been corrected during FEC decoding with error control blocks in a physical layer of the FlexE.

In an implementation, the invalid block is a block marked as invalid in the 64B/66B blocks when errors in the FEC codeword cannot be corrected by FEC decoding, wherein the 64B/66B blocks result from that, for PHYs with FEC, four 64B/66B blocks are transcoded into one 256B/257B block before FEC encoding at a transmit side and transcoded back into the four 64B/66B blocks at a receiver side after the FEC decoding.

In an implementation, the error control block refers to an error control block /E/ defined in IEEE 802.3; the invalid block refers to a 64B/66B block with a synchronization header 0b00 or 0b11.

For ease of description, various parts of the devices are divided in terms of functions into modules or units and described separately. Certainly, the functions of the modules or units may be implemented in the same software or hardware or in multiple pieces of software or hardware.

An embodiment of the present disclosure further provides a computer readable storage medium storing a computer program, wherein the computer program is configured to be executed by a processor to implement the foregoing block processing method.

For detailed implementation, references may be made to the block processing method.

It is appreciated by a person skilled in the art that, embodiments of the present disclosure may be implemented as a method, system or computer program product. Therefore, embodiments of the present disclosure may take the form of a complete hardware embodiment, complete software embodiment or combination of hardware and software. Moreover, embodiments of the present disclosure may take the form of a computer program product embodied as one or more computer usable storage media (including, but not limited to, a magnetic disk storage, optical storage or the like) storing therein computer usable program codes.

The embodiments of the present disclosure have been described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general purpose computer, special purpose computer, embedded processor, or other programmable data processing apparatus to produce a machine, such that the instructions, which are executed via the processor of the computer or other programmable data processing terminal device, create means for implementing the functions specified in the flow diagram flow or flows and/or block diagram block or blocks.

These computer program instructions may also be stored in a computer-readable storage that can direct a computer or other programmable data processing device to function in a particular manner, such that the instructions stored in the computer-readable storage produce an article of manufacture including instruction means which implement the function specified in the flow diagram flow or flows and/or block diagram block or blocks.

The computer program instructions may also be loaded onto a computer or other programmable data processing device to cause a series of operational steps to be performed on the computer or other programmable device to produce a computer-implemented process such that the instructions which are executed on the computer or other programmable device provide steps for implementing the functions specified in the flow diagram flow or flows and/or block diagram block or blocks.

Obviously, modifications and improvements may be made by a person of ordinary skill in the art without departing from the spirit and scope of the present disclosure, and these modifications and improvements shall be encompassed by the present disclosure if the modifications and improvements fall within the scope of the claims of the present disclosure and equivalents thereof.

What is claimed is:

1. A block processing method, comprising:
   determining, in a metro transport network (MTN), or Ethernet, or flexible Ethernet (FlexE), 64B/66B blocks in a forward error correction (FEC) codeword with errors that cannot been corrected;
   replacing all of the 64B/66B blocks in the FEC codeword with error control blocks, or replacing each invalid 64B/66B block in the FEC codeword with an error control block,
   wherein the replacing all of the 64B/66B blocks in the FEC codeword with the error control blocks comprises:
   replacing, in a section layer or path layer or adaptation layer or physical layer of the MTN, all of the 64B/66B blocks in the FEC codeword with errors that cannot been corrected during FEC decoding with error control blocks; or
   replacing, in a physical layer of the Ethernet, all of the 64B/66B blocks in the FEC codeword with errors that cannot been corrected during FEC decoding with the error control blocks; or
   replacing, in a physical layer of the FlexE, all of the 64B/66B blocks in the FEC codeword with errors that cannot been corrected during FEC decoding with error control blocks.

2. The block processing method according to claim 1, wherein the invalid block is a 64B/66B block marked as invalid when the FEC decoder fails to correct errors in a FEC codeword, wherein the 64B/66B blocks result from that, for physical layers (PHYs) with FEC, four 64B/66B blocks are transcoded into one 256B/257B block before FEC encoding at a transmit side and transcoded back into the four 64B/66B blocks at a receiver side after the FEC decoding.

3. The block processing method according to claim 1, wherein the error control block is an error control block /E/ defined in Institute of Electrical and Electronics Engineers (IEEE) standard 802.3; the invalid block is a 64B/66B block with a synchronization header 0b00 or 0b11.

4. A non-transitory computer readable storage medium storing a computer program, wherein the computer program is configured to be executed to implement a block processing method according to claim 1.

5. The non-transitory computer readable storage medium according to claim 4, wherein the invalid block is a 64B/66B block marked as invalid when the FEC decoder fails to correct errors in a FEC codeword, wherein the 64B/66B blocks result from that, for PHYs with FEC, four 64B/66B blocks are transcoded into one 256B/257B block before FEC encoding at a transmit side and transcoded back into the four 64B/66B blocks at a receiver side after the FEC decoding.

6. The non-transitory computer readable storage medium according to claim 4, wherein the error control block is an error control block /E/ defined in IEEE standard 802.3; the invalid block is a 64B/66B block with a synchronization header 0b00 or 0b11.

7. An MTN node, comprising:
   a processor, configured to read a program stored in a memory to implement following steps:
   determining, in an MTN, or Ethernet, or FlexE, 64B/66B blocks of an FEC codeword with errors that cannot been corrected;
   replacing all of the 64B/66B blocks in the FEC codeword with error control blocks, or replacing each invalid 64B/66B block in the FEC codeword with an error control block;
   a transceiver, configured to receive and transmit data under control of the processor,
   wherein the replacing all of the 64B/66B blocks in the FEC codeword with the error control blocks comprises:
   replacing, in a section layer or path layer or adaptation layer or physical layer of the MTN, all of the 64B/66B blocks in the FEC codeword with errors that cannot been corrected during FEC decoding with error control blocks; or
   replacing, in a physical layer of the Ethernet, all of the 64B/66B blocks in the FEC codeword with errors that cannot been corrected during FEC decoding with the error control blocks; or
   replacing, in a physical layer of the FlexE, all of the 64B/66B blocks in the FEC codeword with errors that cannot been corrected during FEC decoding with error control blocks.

8. The MTN node according to claim 7, wherein the invalid block is a 64B/66B block marked as invalid when the FEC decoder fails to correct errors in a FEC codeword, wherein the 64B/66B blocks result from that, for PHYs with FEC, four 64B/66B blocks are transcoded into one 256B/257B block before FEC encoding at a transmit side and transcoded back into the four 64B/66B blocks at a receiver side after the FEC decoding.

9. The MTN node according to claim 7, wherein the error control block is an error control block /E/ defined in IEEE standard 802.3; the invalid block is a 64B/66B block with a synchronization header 0b00 or 0b11.

* * * * *